(12) United States Patent
Liao et al.

(10) Patent No.: US 11,453,127 B2
(45) Date of Patent: Sep. 27, 2022

(54) METHOD FOR PROVIDING POWER-OFF COMMAND TO AN AUTOMATIC APPARATUS WITHIN PROXIMITY OF A HUMAN AND CONTROL APPARATUS EMPLOYING THE METHOD

(71) Applicant: Shenzhen Fugui Precision Ind. Co., Ltd., Shenzhen (CN)

(72) Inventors: Chang-Ching Liao, New Taipei (TW); Shao-Wen Wang, New Taipei (TW); Shih-Cheng Wang, New Taipei (TW)

(73) Assignee: Shenzhen Fugui Precision Ind. Co., Ltd., Shenzhen (CN)

( * ) Notice: Subject to any disclaimer, the term of this patent is extended or adjusted under 35 U.S.C. 154(b) by 318 days.

(21) Appl. No.: 16/807,384

(22) Filed: Mar. 3, 2020

(65) Prior Publication Data

US 2021/0276192 A1 Sep. 9, 2021

(51) Int. Cl.
*B25J 9/16* (2006.01)
*G05D 1/00* (2006.01)
*G06N 3/08* (2006.01)
*G06V 40/10* (2022.01)
*G06V 10/82* (2022.01)

(52) U.S. Cl.
CPC .......... *B25J 9/1676* (2013.01); *G05D 1/0055* (2013.01); *G05D 1/0094* (2013.01); *G06N 3/08* (2013.01); *G06V 10/82* (2022.01); *G06V 40/10* (2022.01)

(58) Field of Classification Search
CPC ....... B25J 9/1676; G06V 40/10; G06V 10/82; G05D 1/0055; G05D 1/0094; G06N 3/08
See application file for complete search history.

(56) References Cited

U.S. PATENT DOCUMENTS

2018/0222052 A1* 8/2018 Vu ........................ B25J 9/1697
2020/0206928 A1* 7/2020 Denenberg ............ G01S 7/4808

FOREIGN PATENT DOCUMENTS

CN 102323822 B 7/2013
EP 3482887 A1 * 5/2019 ............ B25J 9/1676

* cited by examiner

*Primary Examiner* — Fayyaz Alam
(74) *Attorney, Agent, or Firm* — ScienBiziP, P.C.

(57) ABSTRACT

A method for ensuring safety of humans within operating area or in close proximity to an automatic apparatus is applied in and by a control apparatus. The control apparatus is coupled to one or more cameras arranged around the operating area of the automatic apparatus. The control apparatus uses deep learning techniques to analyze images captured by the cameras to determine whether there is a person in the operating area and powers off the automatic apparatus if any person is deemed present.

6 Claims, 2 Drawing Sheets

METHOD FOR PROVIDING POWER-OFF COMMAND TO AN AUTOMATIC APPARATUS WITHIN PROXIMITY OF A HUMAN AND CONTROL APPARATUS EMPLOYING THE METHOD

FIELD

The subject matter herein generally relates to health and safety in the operation of working machines.

BACKGROUND

Injuries due to crossover between persons and machines often occur when a person is carrying out inspection, calibration, setting, cleaning, loading, maintenance, or testing, and in other situations where human workers enter an operating area of an automatic apparatus.

In high-risk operating areas, a hazardous zone can be defined by metal fences, light barriers, or triangular cones, and safety management procedures for human workers and materials can also be established in such environment, however there are still many unexpected factors that may cause accidents and injury.

Thus, there is room for improvement within the art.

BRIEF DESCRIPTION OF THE DRAWINGS

Implementations of the present technology will now be described, by way of embodiment, with reference to the attached figures, wherein.

DETAILED DESCRIPTION

Figure 1:
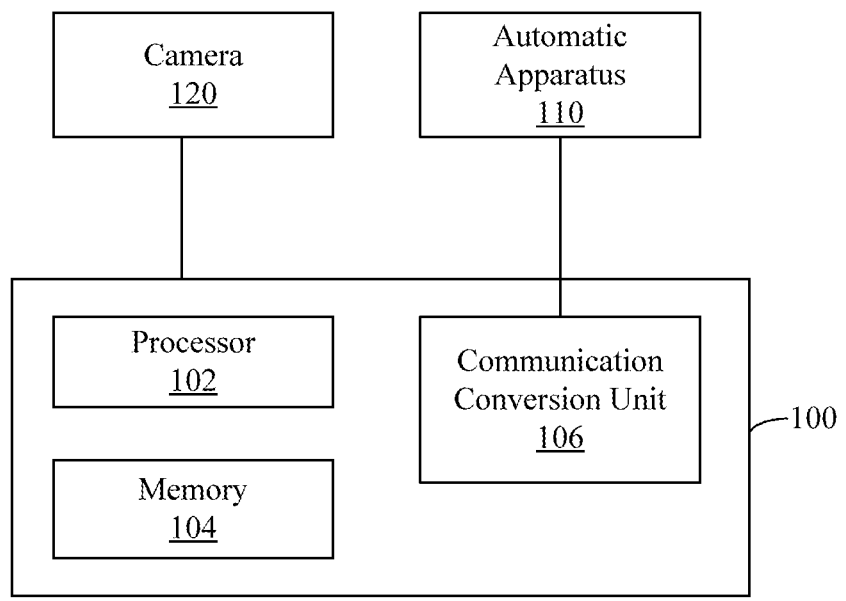
FIG. 1 is a block diagram of one embodiment of a control apparatus.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

References to "an" or "one" embodiment in this disclosure are not necessarily to the same embodiment, and such references mean "at least one".

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series, and the like.

FIG. 1 illustrates an example of a control apparatus (control apparatus 100) for an automatic apparatus 110 according to an embodiment. The control apparatus 100 comprises a processor 102, a memory 104, and a communication conversion unit 106. The memory 104 is coupled to the processor 102. The processor 102 may be a general-purpose central processing unit, a microcontroller, an application-specific integrated circuit (ASIC), or one or more integrated circuits, to execute a related program. The memory 104 may be read-only memory (ROM), a static storage device, a dynamic storage device, or a random access memory (RAM). The memory 104 may store one or more computer programs for operating the control apparatus 100, the programs being executed by the processor 102. The automatic apparatus 110 can be powered on or powered off by the control apparatus 100 to ensure safety. In one embodiment, the power control of the automatic apparatus 110 comprises a plurality of control methods such as dry contacts, programmable logical controller (PLC) and communication protocols. The communication conversion unit 106 comprises a plurality of control signal ports that can be directly connected to a control signal port of the automatic apparatus 110, so that the control apparatus 100 can control the supply of power to the automatic apparatus 110 through the communication conversion unit 106.

In one embodiment, one or more cameras 120 are arranged in proximities to an operating area in which the automatic apparatus 110 is arranged, and each camera 120 can capture images of the operating area. The control apparatus 100 and the camera 120 may communicate using any of a variety of mechanisms, such as wireless communication and wired communication. In another embodiment, the camera 120 may be part of the control apparatus 100. In some examples, the camera 120 may be a two-dimensional camera, three-dimensional camera, or a 360-degree camera, etc.

In one embodiment, the control apparatus 100 receives images captured by the camera 120. The images may be received from one or more cameras, such as the camera 120 in FIG. 1. In one embodiment, the received images may be still images, a sequence of images, a video file or stream. The control apparatus 100 analyzes the received images to recognize whether a person or other moving object is present in the operating area or is entering the operating area. As soon as a person or other moving object is detected in one of the received images, the control apparatus 100 stops supplying power to the automatic apparatus 110 through the communication conversion unit 106.

Figure 2:
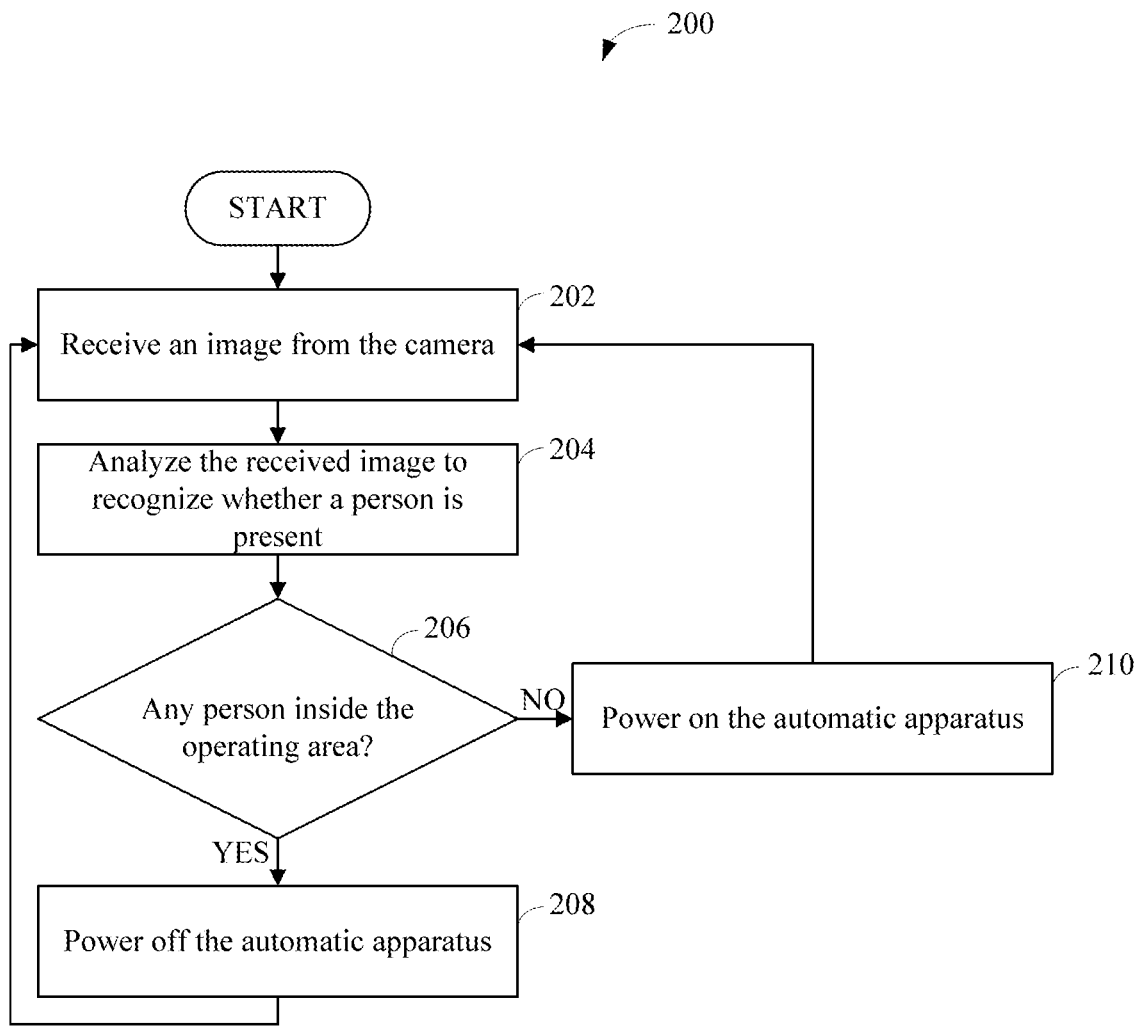
FIG. 2 is a flow chart of one embodiment of a method for providing safety to humans by the control apparatus of FIG. 1.

FIG. 2 illustrates a flow chart of a method 200 in one embodiment for providing safety to humans in relation to automatic apparatus 110, the method 200 being applied by the control apparatus 100.

One or more cameras 120 are arranged at appropriate locations around the operating area in which the automatic apparatus 110 is located. The camera 120 captures images of the operating area including the automatic apparatus 110 and transmits the captured images to the control apparatus 100.

At step 202, the control apparatus 100 receives the images captured by the camera.

At step 204, the control apparatus 110 analyzes the received images for or so as to recognize whether a person is present.

In one embodiment, the control apparatus 100 performs image analysis using deep learning technique. In the embodiment, video captured by one or more camera 120 is processed by the control apparatus 100 as image upon image. A neural network within the control apparatus 110 may process the images differently depending on whether the neural network is in training mode or analysis mode. In training mode, the neural network within the control apparatus 110 may be trained on a plurality of images. The plurality of images can comprise different characteristic poses, such as a human being stretching, standing, bending, squatting, sitting, climbing, etc. The poses are produced by different people wearing different devices, work or other clothes when in close proximity to the apparatus 110. The plurality of images can also comprise a plurality of operations of the automatic apparatus 110 when no persons are present in the operating area. The deep learning applied by the neural network may use one or more algorithms to model high-level abstractions in data corresponding to the plurality of images. Once trained, the neural network may operate in analysis mode. In analysis mode, the images received from the camera 120 are fed to the neural network to recognize a presence of a person.

At step 206, the control apparatus 100 determines whether there is any person inside the operating area by image analysis. If the control apparatus 100 determines that there is at least one person inside the operating area, the control apparatus 100 transmits a power-off control signal through the communication conversion unit 106 to the automatic apparatus 110 at step 208 to power off the automatic apparatus 110. If or as long as the control apparatus 100 determines that there is no person inside the operating area, the control apparatus 100 allows or maintains transmission of a power-on control signal through the communication conversion 106 to the automatic apparatus 110 at step 210.

In one embodiment, the control apparatus 100 checks an operation status of the automatic apparatus 110 before transmitting the power-off or power-on control signal. If the automatic apparatus 110 is already powered off, then the control apparatus 100 waits for a predetermined time period before transmitting a power-on control signal to ensure that no one is in or has re-entered the operating area.

The present disclosure enables the control apparatus 110 analyzes whether a person is present in the operating area of the automatic apparatus 100 and powers off the automatic apparatus 110 immediately if there is any person inside the operating area.

The embodiments shown and described above are only examples. Many details are often found in the art such as the other features of the control apparatus 100 and the automatic apparatus 110. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A method for providing human-machine cross-over safety applied in a control device, the method comprising:
   capturing a plurality of images by a camera arranged in proximities to an operating area of an automatic apparatus, wherein the plurality of images comprise different characteristic poses and a plurality of operations of the automatic apparatus when no persons are present in the operating area, the different characteristic poses comprise a human being stretching, standing, bending, squatting, sitting, and climbing, and the different characteristic poses are produced by different people wearing different devices and work clothes when in close proximity to the automatic apparatus;
   training a neural network by the plurality of images;
   receiving an image captured by the camera;
   inputting the received image to the trained neural network;
   outputting an analyzing result of the received image using the trained neural network; and
   transmitting a power-off signal to the automatic apparatus if the image comprises at least one person in the operating area.

2. The method of claim 1 further comprising:
   transmitting a power-on control signal to the automatic apparatus if the image does not comprise any person in the operating area.

3. The method of claim 2 further comprising:
   checking an operation status of the automatic apparatus before transmitting the power-on control signal; and if the operation status of the automatic apparatus is power-off, transmitting the power-on control signal after a predetermined time period.

4. A control apparatus coupled to a camera and an automatic apparatus, the control apparatus comprising:
   a processor; and
   a memory for storing at least one computer program, wherein the computer program comprises instructions which are executed by the processor, and performs the following steps:
   capturing a plurality of images by a camera arranged in proximities to an operating area of an automatic apparatus, wherein the plurality of images comprise different characteristic poses and a plurality of operations of the automatic apparatus when no persons are present in the operating area, the different characteristic poses comprise a human being stretching, standing, bending, squatting, sitting, and climbing, and the different characteristic poses are produced by different people wearing different devices and work clothes when in close proximity to the automatic apparatus;
   training a neural network by the plurality of images;
   receiving an image captured by the camera;
   inputting the received image to the trained neural network;
   outputting an analyzing result of the received image using the trained neural network; and
   transmitting a power-off signal to the automatic apparatus if the image comprises at least one person in the operating area.

5. The control apparatus of claim 4, wherein the steps further comprise: transmitting a power-on control signal to the automatic apparatus if the image does not comprise any person in the operating area.

6. The control apparatus of claim 5, wherein the steps further comprise: checking an operation status of the automatic apparatus; and when the operation status is power-off, transmitting the power-on control signal after a predetermined time period.

\* \* \* \* \*